No. 878,374. PATENTED FEB. 4, 1908.
F. GEISSLER.
COFFEE OR TEA PERCOLATOR.
APPLICATION FILED JUNE 15, 1906.
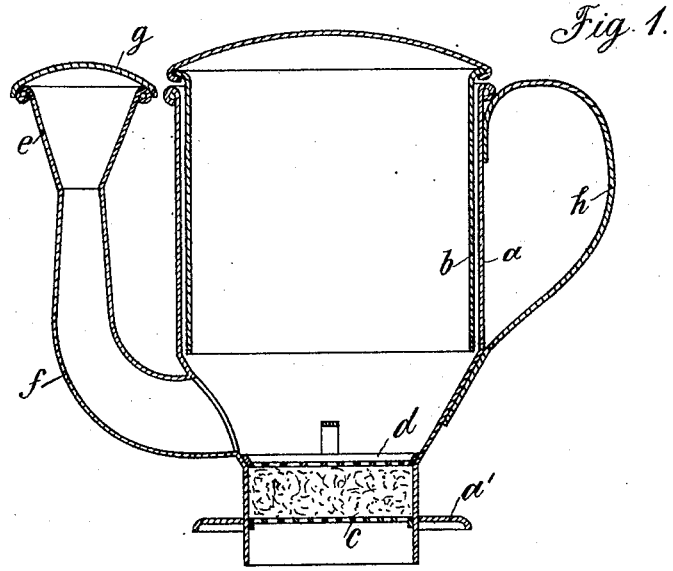
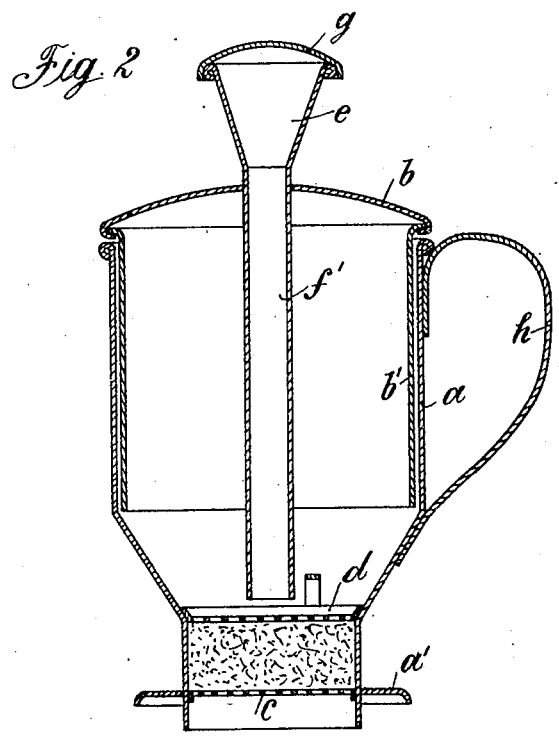
Witnesses:
Thomas Durant
Melville D. Church
Inventor:
Friedrich Geisseler
By Church & Church
his Attys.

UNITED STATES PATENT OFFICE.

FRIEDRICH GEISSLER, OF KLOTZSCHE, NEAR DRESDEN, GERMANY.

COFFEE OR TEA PERCOLATOR.

No. 878,374.  Specification of Letters Patent.  Patented Feb. 4, 1908.

Application filed June 15, 1906. Serial No. 321,929.

*To all whom it may concern:*

Be it known that I, FRIEDRICH GEISSLER, a subject of the King of Saxony, residing in Klotzsche, near Dresden, Germany, have invented a certain new and useful Coffee or Tea Percolator, of which the following is a specification.

Percolators are well known in which hot water is poured through the large opening of the percolator vessel on to the coffee arranged on the sieve at the bottom portion of the percolator, so that during the pouring of the water, a large portion of the aromatic coffee vapors which are at once produced, escapes with the steam. This loss as the process continues becomes still greater because in the cover of the so-called coffee machines a hole is arranged for the escape of steam.

The present invention relates to a percolator by means of which the vapors produced are kept back as completely as possible and made to combine again with the drink.

The invention consists in a percolator having the opening for the introduction of the sieve and the material to be infused, as well as for cleaning, closed by a cover having a deep rim fitting down in the body of the percolator, the infusing liquid being introduced through a narrow branch preferably having a funnel shaped head that can be closed. The cover constitutes a gas bell which is free to rise and fall with the variations in internal pressure, so that the vapors formed in the percolator when pouring in the infusing liquid, which vapors are rich in aromatic substances, in their tendency to expand do not meet any obstacle.

At the beginning of the pouring on of hot water, when a considerable amount of vapor is formed, the hot water filling the percolator and also the space between the cover and the wall of the percolator, forms a steam tight seal.

When the liquid sinks, the cover which has been raised by the steam will also sink, owing to the condensation of the said steam. After the liquid has sunk to such an extent that it no longer forms a seal between the wall of the vessel and the rim of the cover, only a very small quantity of steam can escape through the narrow slot between the two walls, so that a loss of aromatic substances is avoided.

The condensation of steam continues therefore quietly and thus the aromatic substances contained in the steam in the gas holder-like chamber of the percolator are recovered.

In the drawing Figs. 1 and 2 show two constructions according to this invention.

The percolator $a$ is provided in a well known manner with a flange $a'$ to hold it on the coffee pot proper, with a bottom sieve $c$ and a top sieve $d$. It is also provided, according to Fig. 1, opposite the handle $h$, with a tubular branch $f$ entering the percolator adjacent to the top sieve $d$. This tubular branch is provided with a funnel shaped head $e$, which can be closed by a cover $g$. The large opening of the funnel $a$ is maintained closed by means of a cover $b$ having the shape of a gas-holder bell and provided with a rim, the lower edge of which is about level with the mouth of the branch $f$.

As shown in Fig. 2, the branch $f'$ with the funnel-shaped head $e$ for pouring in hot water, is arranged in the cover of the vessel $b$. For the purpose of forming a water seal, it is extended down to the bottom portion of the vessel.

Hot water introduced through the branch $f$ or $f'$, collects at first over the material to be infused, and forms a seal between the rim of the cover and the wall of the percolator. As the cover of the branch is closed immediately after pouring in water, the steam produced, containing large quantities of aromatic substances, raises the cover.

When the liquid descends, owing to the steam beginning to condense, the cover also descends, but the joint still remains closed by a water seal. Only when the liquid in the percolator sinks very low and after it has passed completely through the material to be infused, the water seal is destroyed, but the narrow slot between the rim of the cover and the wall of the percolator enables only a very small quantity of steam to escape so that complete condensation of all the steam and recovery of the aromatic substances in it are insured.

What I claim as my invention and desire to secure by Letters Patent is:—

1. In a coffee or tea percolator, the combination with a receptacle open at the top and having a holder for the material to be treated at the bottom thereof, of a cover for closing the receptacle having a deep rim extending down into the receptacle with a clearance space between said rim and wall of the receptacle, said cover being free to rise and fall with the variations in internal pressure and a filling branch for the infusing liquid opening into the percolator below the lower edge of the cover, the liquid forming a seal between the rim of the cover and wall of the percolator.

2. In a coffee or tea percolator and in combination a receptacle having a large top opening a cover for said opening with a deep rim extending down into said receptacle, a clearance space between said rim and the sides of said receptacle, a sieve forming the bottom of said receptacle, a tubular branch of small diameter arranged to one side of said receptacle and opening into said receptacle adjacent to the upper surface of said sieve, a funnel-shaped top to said tubular branch and a cover for said top.

In testimony whereof I have signed my name to this specification in the presence of two subscribing witnesses.

FRIEDRICH GEISSLER.

Witnesses:
  OTTO WOLF,
  RICHARD YSSERTE.